United States Patent [19]

Penny

[11] Patent Number: 4,792,846

[45] Date of Patent: Dec. 20, 1988

[54] COMPONENT TELEVISION TIMING CORRECTOR

[75] Inventor: Bruce J. Penny, Portland, Oreg.

[73] Assignee: Tektronix, Inc., Beaverton, Oreg.

[21] Appl. No.: 66,667

[22] Filed: Jun. 26, 1987

[51] Int. Cl.[4] .......................... H04N 9/44; H04N 9/77
[52] U.S. Cl. .......................................... 358/17; 358/35
[58] Field of Search .................... 358/10, 17, 21 R, 35, 358/37, 51

[56] References Cited

U.S. PATENT DOCUMENTS

| 4,101,926 | 7/1978 | Dischert et al. | 358/19 |
| 4,214,262 | 7/1980 | Mizukami | 358/19 |
| 4,388,641 | 6/1983 | Yamamoto et al. | 358/51 |
| 4,485,395 | 11/1984 | Warren | 358/17 |

FOREIGN PATENT DOCUMENTS 103894  6/1985  Japan ..................................... 358/17

OTHER PUBLICATIONS

"Automatic Centering Unit for the Registration of a Three-Tube Color Television Camera", by A. W. Critchley, Jan. 1972, SMPTE Journal, vol. 81.

Primary Examiner—John W. Shepperd
Attorney, Agent, or Firm—Francis I. Gray

[57] ABSTRACT

A component television timing corrector uses edge transitions in the program material of a television signal to determine the time differences between color component signals of the television signal due to the processing of the color component signals along different paths. One of the color component signal channels is made a reference channel, and the time differences between the edge transitions in the reference channel and in the other color component signal channels is determined. The time differences are used to delay the other two color component signal channels with respect to the reference color component signal channel so that the resulting color component signals are in time coincidence.

10 Claims, 1 Drawing Sheet

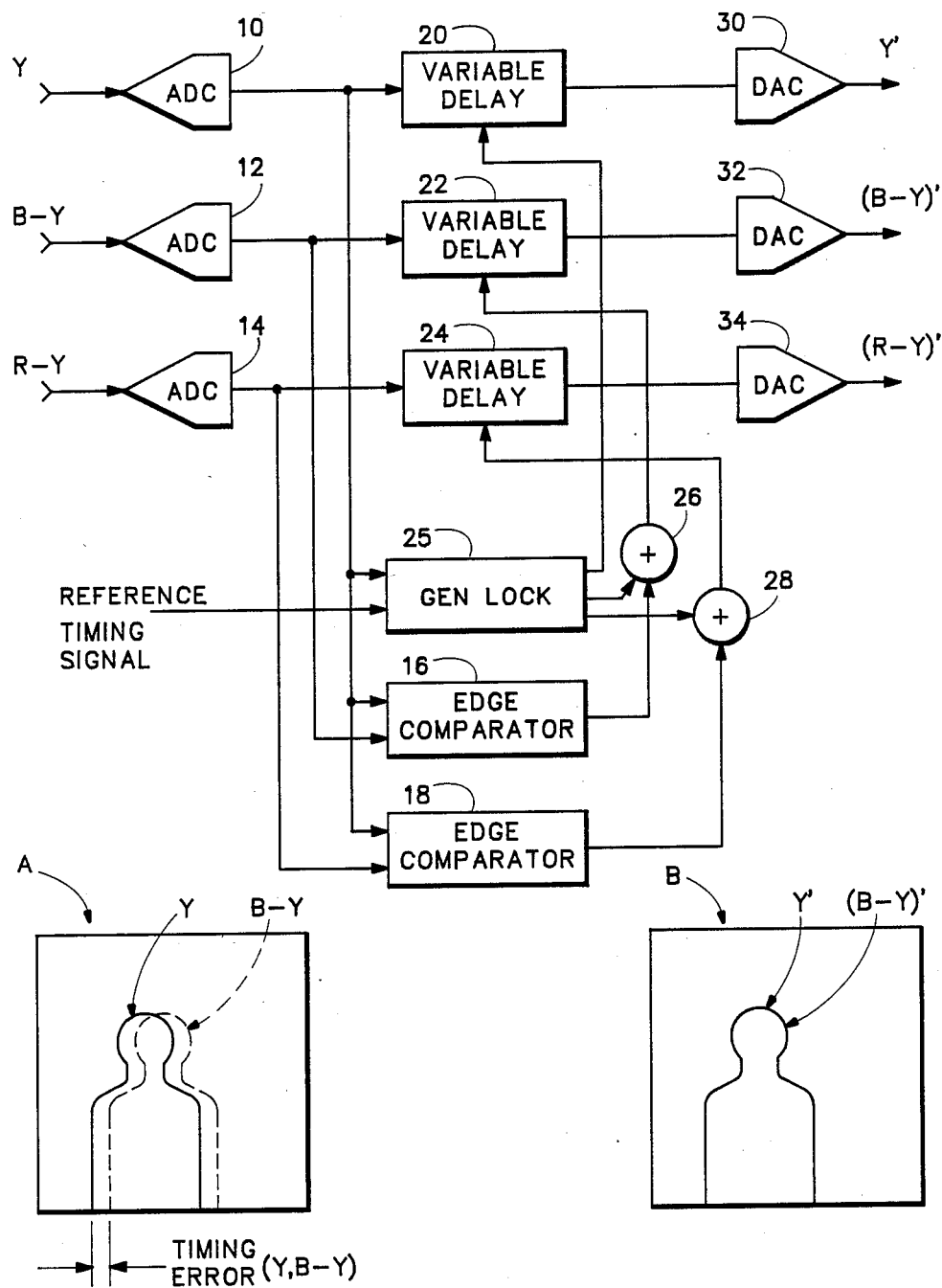

COMPONENT TELEVISION TIMING CORRECTOR

BACKGROUND OF THE INVENTION

The present invention relates to timing corrections, and more particularly to a component television timing corrector for maintaining time alignment between the three components of a color television signal to achieve optimum picture quality.

Typically color television signals are composed of three components. Even in the standard composite broadcast format, such as NTSC, PAL or SECAM, at some point some signal processing is done in component form. The component form is usually a luminance component Y and two color difference components B-Y, R-Y. Component signal processing invariably results in differential timing errors between the components as each component is processed separately, resulting in picture distortions to a viewer. Although the luminance component often includes a sync pulse for timing reference, the color components often do not. Prior attempts to compensate for the difference in timing among the various component signal paths have been to transmit a test signal along the different signal paths and compare the outputs, adjusting a delay device in one path to assure coincidence of the output test signals. Such a system is described in co-pending U.S. application Ser. No. 722,943 filed Apr. 12, 1985 by Bruce J. Penney entitled "Method and Apparatus for Measuring Delay and/or Gain Difference". This requires a separate test signal generator to generate the test signal, and does not compensate for drift in the signal processing paths between calibrations.

What is desired is a component television timing corrector which is self-calibrating and can maintain a constant correction of the component signal path timing differences to compensate for drift.

SUMMARY OF THE INVENTION

Accordingly the present invention provides a component television timing corrector which uses program material of a television signal for timing measurement. The color component signals are converted to digital and input to respective variable delay lines. A reference timing generator provides a master timing signal to synchronize one channel to a reference signal, that channel becoming the reference channel. The digitized signal from the reference channel is input to respective edge comparator circuits for the other two channels such that the reference channel is compared with the channel two in one edge comparator, and with channel three in the other edge comparator. The outputs of the edge comparator circuits are combined with the master timing signal and used to control the respective variable delays for channels two and three. The compensated components from the variable delay lines are then converted back to analog for display.

The objects, advantages and other novel features of the present invention will be apparent from the following detailed description when read in conjunction with the appended claims and attached drawing.

BRIEF DESCRIPTION OF THE DRAWING

The FIGURE is a block diagram view of a digital implementation for a component television timing corrector according to the present invention.

DESCRIPTION OF THE PREFERRED EMBODIMENT

Referring now to the FIGURE a component color television signal has a luminance component Y and two color difference components B-Y, R-Y which have been processed along separate signal processing paths. As shown by inset A an object appearing on a display will demonstrate "color misregistration" where there is appreciable delay difference between the signal processing paths. The color signal components are digitized by respective analog to digital (ADC) converters 10, 12, 14. One component channel, such as the Y channel, is selected to be a reference channel to which the other channels will be synchronized. The output of the Y channel ADC 12 is input to an edge comparator 16 for one of the other channels, such as the B-Y channel, and to an edge comparator 18 for the other channel, such as the R-Y channel. The output of the B-Y channel ADC is input to the first edge comparator 16, and the output of the R-Y channel ADC 14 is input to the second edge comparator 18. The outputs of the respective ADCs 10, 12, 14 are also input to respective variable delay circuits 20, 22, 24.

A reference timing signal, such as the master sync signal for the television studio, is used to synchronize a genlock circuit 25. The genlock circuit 25 compares the timing of the luminance component and the reference timing signal. The output of the genlock circuit 25 provides a reference delay signal which is input to the Y channel variable delay circuit 20 to assure synchronization with the reference timing signal. The outputs of the respective edge comparators 16, 18 are input to respective summers 26, 28 where they are combined with the reference delay signal from the genlock circuit 25. Since the timing error between component signal processing paths can be either positive or negative with respect to the reference channel, the resulting delay signals from the summers 26, 28 may provide either a greater or lesser delay compared to the reference delay signal. The delay signal from the first summer 26 is input to the B-Y channel variable delay circuit 22, and the delay signal from the second summer 28 is input to the R-Y channel variable delay circuit 24. The delayed outputs from the respective variable delay circuits 20, 22, 24 are input to respective digital to analog converters (DAC) 30, 32, 34 to produce the time corrected color component signals Y', (B-Y)', (R-Y)'. Inset B illustrates the resulting picture after the timing errors have been corrected.

Edge transitions that appear in a television picture generally affect all the color signal component. The edge comparators 16, 18 analyze these transitions for the respective input component signals to determine the midpoint of the transitions. The time difference between the midpoints of the respective channels is determined and averaged over several transitions. The resulting time difference, whether positive or negative with respect to the reference channel input, is output for combination with the reference delay signal from the genlock circuit 25 to form respective control words proportional to such time differences. The variable delay circuits 20, 22, 24 may be in the form of buffer memories into which the respective digitized color component signals are stored. The reference delay signal may be an address word that increments at a predetermined rate and the delay signals from the edge comparators 16, 18 may be address increments such that the control words serve to address the buffer memories to produce the time corrected output color component signals.

Thus the present invention provides a component television timing corrector which uses edge transitions in the television picture program material to determine a time difference between the color component signal processing paths, the time differences being used to correct the timing errors between signal processing paths to produce a time corrected color component television signal output.

What is claimed is:

1. A component television timing corrector comprising:
    means for determining for the program material content of a color television signal time differences between each color component signal of the color television signal and a reference timing signal, the color component signals being separately processed along different paths; and
    means for delaying each color component signal according to the time difference for that color component to provide delayed color component signals that are in time coincidence.

2. A component television timing corrector as recited in claim 1 wherein the determining means comprises means for comparing the timing of one of the color component signals as a reference component signal with the reference timing signal to produce a reference time difference.

3. A component television timing corrector as recited in claim 2 wherein the determining means further comprises:
    means for detecting transitions within each color component signal; and
    means for comparing the detected transitions between the reference component signal and each of the other color component signals to produce intermediate time differences from which the time differences are derived.

4. A component television timing corrector as recited in claim 3 wherein the determining means further comprises means for combining the intermediate time differences with the reference time difference to produce the time differences.

5. A component television timing corrector as recited in claim 4 wherein the determining means further comprises means for averaging the output of the transition comparing means over a number of transitions to produce the intermediate time differences.

6. A component television timing corrector as recited in claim 1 wherein the determining means comprises an edge comparator having as inputs one of the color components signals as a reference input and a second color component signal, an intermediate time difference being determined between the two inputs from which the time difference for the second color components is derived.

7. A component television timing corrector as recited in claim 1 further comprising means for converting the color component signals into respective digital color component signals, the time differences being determined from the digital color component signals and being used to produce digitized delayed color component signals from the delaying means.

8. A component television timing corrector as recited in claim 7 further comprising means for converting the digitized delayed color component signals into the delayed color component signals.

9. A component television timing corrector as recited in claim 8 wherein the determining means comprises:
    means for generating reference control words from the reference timing signal;
    means for detecting transitions for each digital color component signal;
    means for comparing the detected transitions between one of the digital color component signals as a reference input and each of the other digital color component signals as a second input to generate a delay control word for each of the other digital color component signals proportional to the difference in time between the transitions of the respective inputs; and
    means for combining the reference control word with the delay control words to generate a time control word for input to the delaying means to delay the respective digital color component signals.

10. A component television timing corrector comprising:
    means for comparing the timing of one of a plurality of color component signals, representing the program material content of a color television signal, as a reference component signal with a reference timing signal to produce a reference delay signal;
    means for determining time differences between the reference component signal and each of the other color component signals;
    means for combining the time differences with the reference delay signal to produce a delay signal for each of the other color component signals; and
    means for delaying each of the color component signals according to their respective delay signals to produce delayed color component signals that are in time coincidence.

* * * * *